Figure 1:
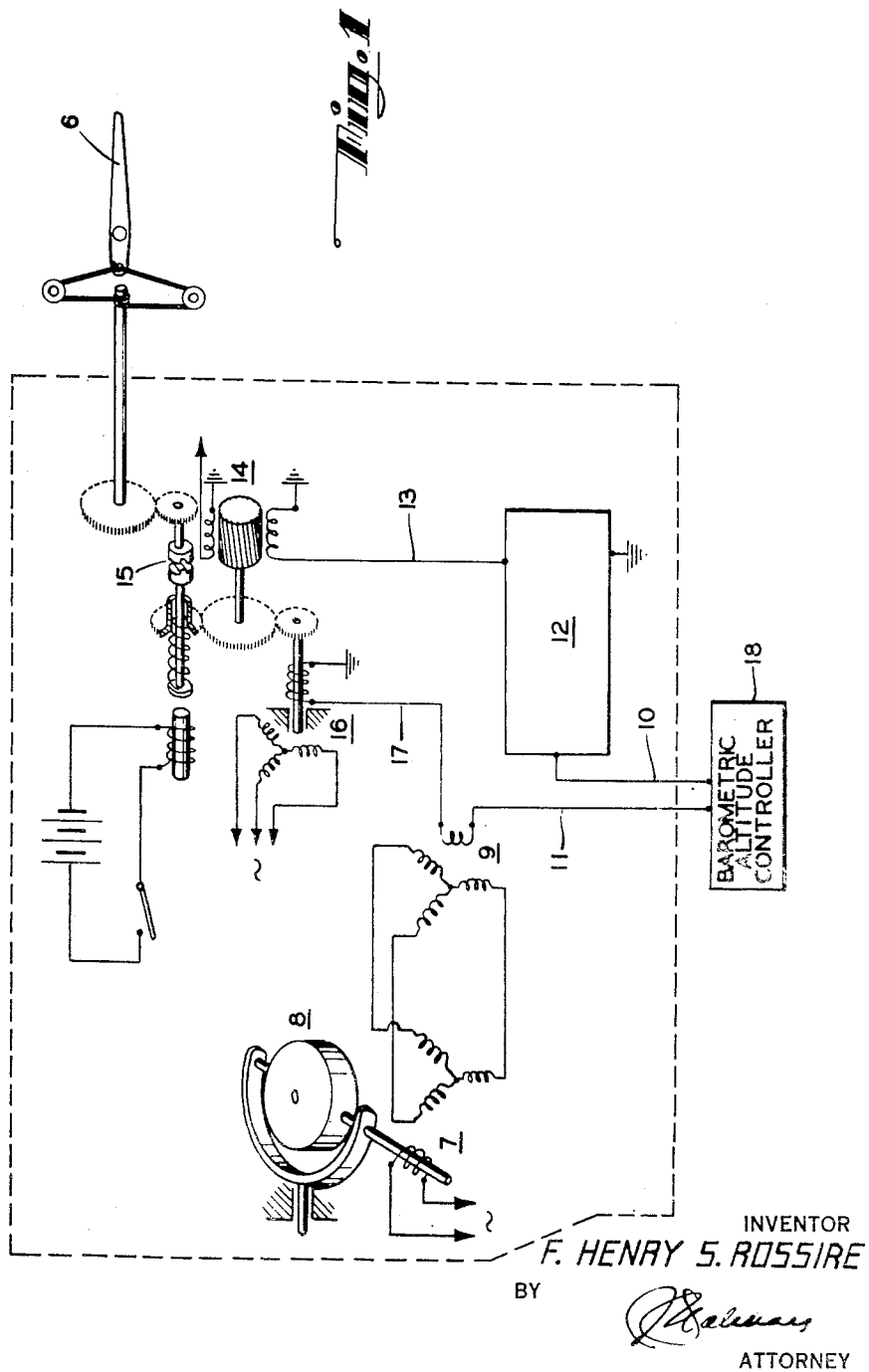

June 27, 1950          F. H. S. ROSSIRE          2,512,902
AIRCRAFT ALTITUDE CONTROL Filed Jan. 28, 1948          2 Sheets-Sheet 1

INVENTOR
*F. HENRY S. ROSSIRE*
BY
ATTORNEY

Patented June 27, 1950

2,512,902

UNITED STATES PATENT OFFICE 2,512,902

AIRCRAFT ALTITUDE CONTROL

Francis Henry S. Rossire, Leonia, N. J., assignor to Bendix Aviation Corporation, Teterboro, N. J., a corporation of Delaware Application January 28, 1948, Serial No. 4,774

8 Claims. (Cl. 318—481)

This invention relates generally to automatic steering systems for aircraft and more particularly to altitude control means therefor whereby the aircraft will be automatically maintained at a desired altitude level and as such constitutes an improvement over the altitude control unit of copending application Serial No. 660,343, filed April 8, 1946.

Generally, level craft flight attitude is automatically maintained by controlling elevator surfaces from a pitch take-off located at a gyro horizon which only responds to a nose-up or nose-down condition to bring the aircraft to the desired level attitude. Even though the gyro horizon and its pitch take-off are effective to control level craft flight, they are not able to maintain the craft at a desired altitude. A change in craft elevation may take place due to up or down drafts without a change in the relation between the longitudinal axis of the craft and the plane of level flight so that a relation of equilibrium will be maintained between the gyro and its take-off whereby no counter-acting control is provided to the elevator.

In order to overcome this disadvantage so as to maintain the craft at the desired altitude level, the novel arrangement of aforementioned application Serial No. 660,343 has been proposed wherein a pressure responsive member, opened to the atmosphere on one side and adapted for drivable connection with a signal generating device through an electromagnetic clutch, drives the signal generating device in response to altitude changes occurring subsequent to clutch energization. A centering device is provided to restore the signal generating device to its null or zero position upon the de-energization of the electromagnetic clutch.

The present invention contemplates an improvement over the arrangement of the aforementioned application Serial No. 660,343 in that an overload device for the storage of excessive signals developed by the pressure responsive member is provided to prevent clutch slippage and the resulting loss of reference. Also the centering device is automatically disengaged during the operation of the altitude control unit to eliminate unnecessary loading of the pressure responsive member thereby improving its sensitivity and the all around reliability of the unit.

An object of the present invention, therefore, is to provide a novel and improved barometric altitude controller for automatically maintaining craft flight at a desired altitude level notwithstanding up or down drafts.

Another object of the present invention is to provide in a barometric altitude controller for maintaining craft flight at a desired altitude, means for the storage of excessive signals developed by the pressure responsive member to prevent thereby the loss of reference.

A still further object of the present invention is to provide in a barometirac altitude controller for maintaining craft flight at a desired altitude, means for automatically disengaging the centering device during the operation of the altitude control unit to increase thereby its sensitivity.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
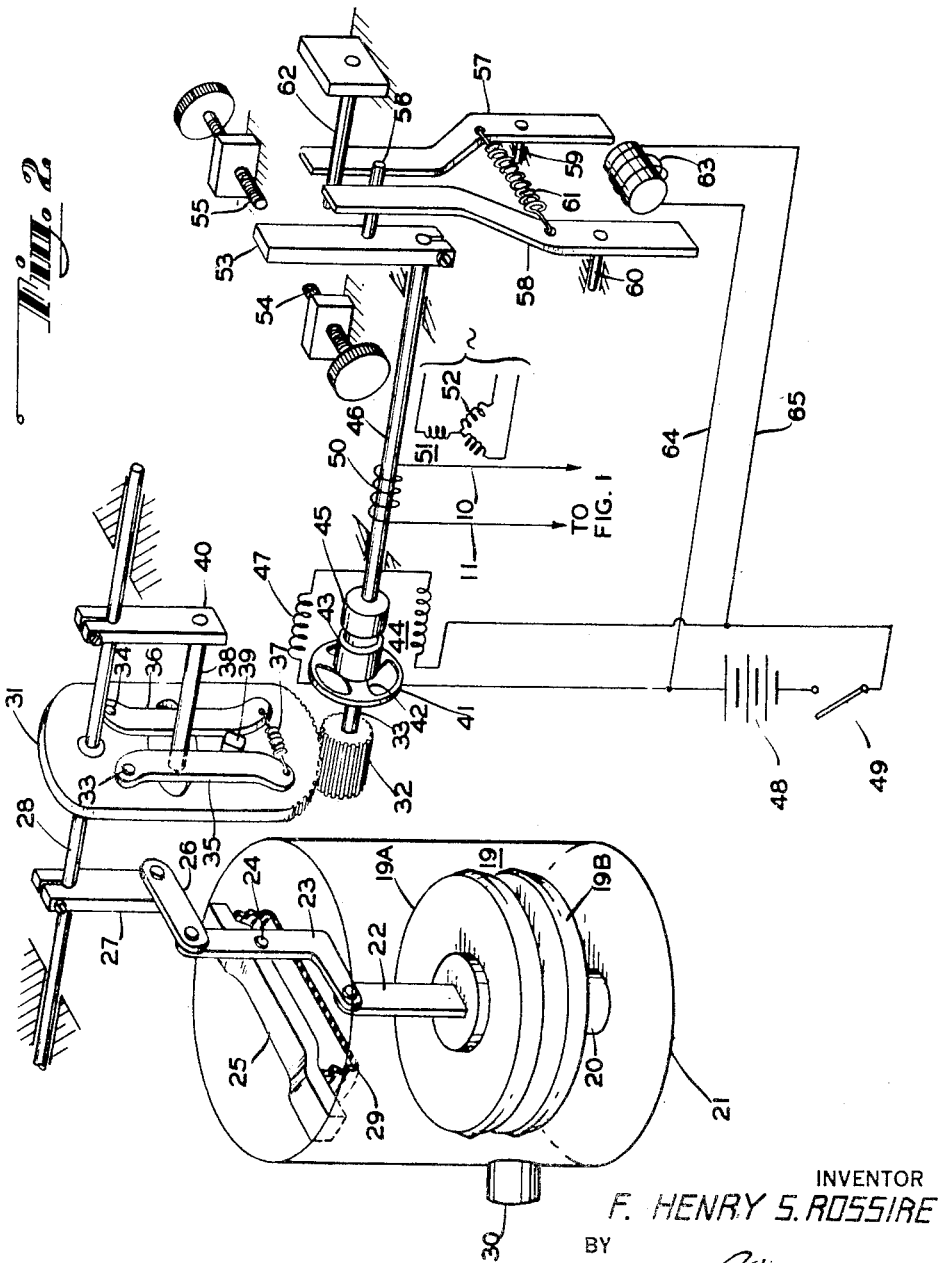

In the drawings, wherein like reference numerals refer to like parts,

Figure 1 is a diagrammatic illustration of the elevator control portion of an automatic steering system embodying the novel barometric altitude controller of the present invention; and, Figure 2 shows the apparatus and circuits of the novel barometric altitude controller constituting the present invention.

The automatic steering arrangement hereof may be generally similar to that fully described and claimed in copending application Serial No. 516,488, filed December 31, 1943, and for a better understanding of the present invention the pitch control channel thereof only has been here illustrated. As more fully described in the latter application, the control of elevator 6 as shown in Figure 1 is derived from pitch take-off 7 arranged about the pitch axis of an artificial horizon gyro 8. As a result of a pitch condition, take-off 7 develops a signal which is communicated through an adjustable or manually settable inductive pitch receiver device 9 to the input of the pitch channel of a servo amplifier 12. The output of the pitch channel is communicated by means of lead 13 to energize motor 14 which operates through clutch 15 the elevator surface 6. The operation of motor 14 also displaces an inductive follow-up device 16 to develop a follow-up signal therein which is algebraically added to the pitch signal of take-off 7 by means of lead 17 to modify the operation of motor 14.

In the embodiment of the present invention, the barometric altitude controller 18, as illustrated in Figure 2, comprises one or more aneroid diaphragms 19 superimposed upon each other in a fixed relation with the lower disc of diaphragm 19A centrally secured to the upper disc of diaphragm 19B and the lower disc of diaphragm 19B secured to a stud 20 fastened to the bottom of casing 21. The upper disc of diaphragm 19A is connected through fixed arm 22 to one arm of bell crank 23 pivoted at point 24 by bracket 25 attached to the underside of the top of casing 21. The other arm of bell crank 23 is connected by means of link 26 to a crank arm 27 rigidly fastened to shaft 28. An airtight seal around bell crank 23 is maintained by a boot 29. Casing 21 is provided with an opening 30 to the atmosphere so that as the static pressure changes due to a change in altitude, diaphragm 19A and 19B will expand or contract to move arm 22 up or down to angularly displace bell crank 23 about pivot 24. The motion of bell crank 23, transmitted through link 26 to crank arm 27, imparts a rotary motion to shaft 28.

Pivoted for free rotation upon shaft 28, sector 31 meshes with a pinion 32 rigidly fastened to one end of shaft 33. Sector 31 has mounted thereon, by means of pivots 33 and 34, respectively, two freely moving centering levers 35 and 36 which are held together by tension spring 37. Between levers 35 and 36 are pins 38 and 39. Pin 38 is pressed into one end of a crank arm 40 which is rigidly fastened at its other end to shaft 28 adjacent to sector 31, while pin 39 is pressed into sector 31. Pin 39 is flat sided and can be turned to have levers 35 and 36 simultaneously in contact with pins 38 and 39. As shaft 28 rotates, crank arm 40 turns together with pin 38 against either lever 35 or 36, depending upon the direction of rotation. If the direction of rotation is such that pin 38 displaces lever 35, tension is exerted on spring 37 to pull lever 36 against pin 39 causing sector 31 to turn about shaft 28 as its pivot until pins 38 and 39 come into alignment. On the other hand, if the direction of rotation is such that pin 38 displaces lever 36, tension is exerted on spring 37 to pull lever 35 against pin 39 causing sector 31 to turn in the opposite direction until pins 38 and 39 come in alignment. The rotating movement of shaft 28 is thus imparted through sector 31 to pinion 32 and shaft 33.

At its other end shaft 33 carries a disc 41 to which is attached, by means of resilient member 42, the engaging face 43 of an electromagnetic clutch 44. The fixed face 45 of the clutch is attached to one end of a shaft 46 which is coaxially mounted with shaft 33. Clutch faces 43 and 45 are surrounded adjacent to their outer periphery by a coil 47 which is adapted for energization by a battery 48 upon the closing of a switch 49. The electromagnetic clutch 44 illustrated herein is more fully described and claimed in copending application Serial No. 513,421, filed December 8, 1943, which issued on September 17, 1946, as Patent No. 2,407,757. Energization of coil 47 urges clutch face 43 outwardly relative to its shaft 33 into engagement with clutch face 45 whereby the motion of the aneroid diaphragms 19 is communicated to shaft 46.

For motion therewith, shaft 46 carries thereon a single phase rotor winding 50 of inductive signal generating device 51 for displacement with respect to its associated three phase stator winding 52, energized from a suitable source of alternating current potential which may be a single phase supply. One end of rotor winding 50 connects by means of lead 10 to the input of the pitch channel of servo amplifier 12, while the other end receives by means of lead 11 the pitch signal of pitch take-off 7 and follow-up signal from follow-up device 16. Signal generating device 51 develops within rotor winding 50 a control signal whose magnitude is directly proportional to the relative angular displacement of rotor winding 50 with respect to stator winding 52. Normally, rotor winding 50 is maintained at its null position relative to stator winding 52, but any motion of rotor winding 50 as a result of the contraction or expansion of aneroid diaphragms 19 develops a control signal within rotor winding 50 proportional to the amount of motion of the aneroid diaphragm 19.

Normally switch 49 is open so that electromagnetic clutch 44 is disengaged whereby the aneroid diaphragm 19 may expand or contract without any effect on rotor winding 50 of signal generating device 51. Once the desired craft altitude is reached and the aircraft is levelled off, the barometric altitude controller 18 is engaged by closing switch 49 which by the energization of coil 47 engages clutch 44, to provide thereby a connection between aneroid diaphragm 19 and rotor winding 50. Thereafter, a change in craft elevation without a change in the relation of the fore and aft axis thereof, produces a pressure change within casing 21 to cause motion of aneroid diaphragm 19 whereupon rotor winding 50 is displaced from its null position to develop a signal that is communicated to servo amplifier 12 to energize motor 14 and actuate elevator 6.

As the craft returns to the desired altitude level as a result of the displacement of elevator 6, the pressure within casing 21 changes until rotor winding 50 is returned to its null and the signal drops to zero while elevator 6 is returned to its neutral position by follow-up device 16. During the craft's return to its prescribed altitude, pitch take-off 7 develops a signal to level off the elevator 6. If this occurs and the desired altitude has not been attained, a control signal will still be available at rotor winding 50 to actuate elevator 6 until the desired altitude is attained. The signals developed by take-off 7 and rotor winding 50 actually provide an average displacement signal on elevator 6 so that the craft is returned to and maintained at the desired altitude.

To the end of shaft 46 adjacent to rotor winding 50 of signal generating device 51 is rigidly fastened a crank arm 53. Rotation of crank arm 53 is limited by adjustable stops 54 and 55. Thus the control signal developed by rotor winding 50 can be controlled so as to keep the aircraft from assuming any dangerous angles of dive or climb.

A change in craft elevation of such magnitude as to cause the motion of aneroid diaphragms 19 to produce an angular displacement of shaft 28 in excess of the amount that stops 54 and 55 allow shaft 46 to rotate, would in the absence of an overload device continue to act upon pinion 32 so as to cause engaging face 42 of electromagnetic clutch 44 to slip with respect to fixed face 45, thus destroying the established reference whereby the craft would be unable to return to the desired altitude. Sector 31 together with links 35 and 36 and spring 37 operates as an overload device in storing the excess angular displacement of shaft 28 by the application of tension to spring 37. Upon shaft 46 attaining the limit of displacement as fixed by stops 54 and 55, sector 31 and pinion 32 come to a stop and the unexpended amount of angular displacement of shaft 28 continues to act through crank arm 40 and pin 38 to further displace either lever 35 or 36 by the application of tension to spring 37 until the excess motion is expended whereby clutch slippage and loss of reference is prevented.

If prior to the attainment of the original altitude level, it becomes necessary to disconnect the barometric altitude controller 18, the de-energization of coil 47 of clutch 44 to break the drivable connection between aneroid diaphragms 19 and rotor winding 50 does not return the rotor winding to its null position but leaves it displaced therefrom, so that rotor winding 50 continues to generate a signal to produce a displacement of elevator 6 and to cause the aircraft to climb or dive. To the end that rotor winding 50 is always returned to its null position upon the disengagement of the barometric altitude controller 18, crank arm 53 has pressed therein a pin 56 which is engaged by a pair of levers 57 and 58, respectively, mounted for free motion at pivots 59 and 60. Levers 57 and 58 are held together by tension spring 61 which pulls both levers inwardly to center pin 56 and therefore rotor winding 50 to its null position. A limit pin 62 defines the limits of inward motion for levers 57 and 58 thereby establishing the null position of rotor winding 50. Pin 62 is flat sided and can be turned to have levers 57 and 58 simultaneously in contact with pins 56 and 62. Upon the engagement of the barometric altitude controller 18, the action of levers 57 and 58 upon pin 56, and consequently shaft 46, would place an additional burden upon aneroid diaphragm 19 to decrease thereby the sensitivity for small changes of altitude. While the barometric altitude controller 18 is engaged, aneroid diaphragm 19 automatically returns rotor winding 50 to its null position so that the requirement of centering rotor winding 50 is necessary only when the barometric altitude controller 18 is disengaged prior to the attainment of the original altitude. An electromagnet 63 is provided to disengage levers 57 and 58 from pin 56 during the engagement of the barometric altitude controller 18 thereby eliminating the additional burden placed upon aneroid diaphragms 19. Electromagnet 63 connected in parallel with coil 47 of clutch 44 by means of leads 64 and 65, acts upon the engagement of barometric altitude controller 18, by the closing of switch 49, to pull levers 57 and 58 apart so that pin 56, and consequently shaft 46, may rotate freely. Upon the disengagement of the barometric altitude controller 18, by the opening of switch 49, electromagnet 63 is de-energized, releasing levers 57 and 58 to act upon pin 56 so as to return rotor winding 50 to its null position.

As will now be readily apparent to those skilled in the art, a novel and desirable altitude control unit has been provided for use in an automatic steering system to supplement the normal pitch control thereof whereby a craft may be maintained not only in a desired level attitude but will be also maintained automatically at a desired altitude level.

Although but one embodiment of the invention has been illustrated and described in detail, various changes and modifications in the form and relative arrangement of parts which will now appear to those skilled in the art, may be made without departing from the scope of the invention.

I claim:

1. An altitude controller for operating the elevator surface of an aircraft for automatically maintaining craft flight at a predetermined altitude level comprising a movable signal generator for developing a signal for actuating said surface when craft flight departs from a predetermined altitude level, means normally yieldably urging said generator to a non-signal generating position, means responsive to pressure changes due to changes in craft altitude level for actuating said signal generator from said non-signal generating position, means for drivably connecting said pressure responsive means to said signal generator and for disconnecting the pressure responsive means from the generator, and means for operating said last-named means and for making said yieldable means ineffective when the pressure responsive means is connected to said signal generator.

2. An altitude controller for operating the elevator surface of an aircraft for automatically maintaining craft flight at a predetermined altitude level comprising a signal generator movable from a normally null position for developing a signal for actuating said surface when craft flight departs from a predetermined altitude level, means responsive to pressure changes due to changes in craft altitude level for actuating said signal generator from said null position, means for drivably connecting said pressure responsive means to said signal generator and for disconnecting the pressure responsive means from the generator, and yieldable means associated with said last-named means and effective when said pressure responsive means is disconnected from said generator for urging said generator to its null position, the action of said yieldable means being ineffective on said generator when the latter is drivably connected to said pressure responsive means.

3. An altitude controller for operating the elevator surface of an aircraft to automatically maintain craft flight at a predetermined altitude level comprising a displaceable signal generator which when actuated develops a signal for operating said elevator, a displaceable member responsive to changes in static pressure when the craft departs from said predetermined altitude level for actuating said generator, means for drivably connecting said generator with said pressure responsive member, means limiting the amount of generator displacement by said pressure responsive member, and an overload device actuated by said pressure responsive member when motion of the latter exceeds the amount of motion required to displace the generator the permissible amount whereby loss of reference in the driving connection is prevented.

4. An altitude controller for operating the elevator surface of an aircraft to automatically maintain craft flight at a predetermined altitude level comprising a displaceable signal generator which when actuated develops a signal for operating said elevator, a displaceable member responsive to changes in static pressure when the craft departs from said predetermined altitude level for actuating said generator, clutch means for drivably connecting said generator with said pressure responsive member, adjustable means for limiting the amount of generator displacement by said pressure responsive member, and a yieldable overload device actuated by said pressure responsive member when motion of the latter exceeds the amount of motion required to displace the generator the permissible amount whereby the device absorbs the excessive force developed by said member to thereby prevent slippage of said clutch means.

5. An altitude controller for operating the elevator surface of an aircraft to automatically maintain craft flight at a predetermined altitude level comprising a displaceable signal generator which when actuated from a normally centered position develops a signal for operating said elevator, a displaceable member responsive to changes in static pressure when the craft departs from said predetermined altitude level for actuating said generator, electro-magnetic clutch means which when energized drivably connect said generator with said pressure responsive member, yieldable means for centering said generator when the latter is disconnected from the pressure responsive member, adjustable means for limiting the amount of generator displacement by said pressure responsive member to thereby prevent the development of excessive signals by said generator when the craft is subjected to excessive up-drafts or down-drafts, a yieldable overload device actuated by said pressure responsive member when motion of the latter resulting from such up-drafts or down-drafts exceeds the amount of motion required to displace the generator the permissible amount whereby the overload device absorbs the excessive force developed by said member to thereby prevent slippage in said clutch means, and means for de-energizing said clutch means to disconnect said pressure responsive member from said generator and for actuating said yieldable centering means to center said generator.

6. An altitude controller for operating the elevator surface of an aircraft to automatically maintain craft flight at a predetermined altitude level comprising a displaceable signal generator which when actuated from a normally centered position develops a signal for operating said elevator, a displaceable member responsive to changes in static pressure when the craft departs from said predetermined altitude level for actuating said generator, electro-magnetic clutch means which when energized drivably connect said generator with said pressure responsive member, means comprising an electro-magnet which is de-energized when said pressure responsive member is disconnected from said generator for centering said generator, adjustable means for limiting the amount of generator displacement by said pressure responsive member to thereby prevent the development of excessive signals by said generator when the craft is subjected to excessive up-drafts or down-drafts, a yieldable overload device actuated by said pressure responsive member when motion of the latter resulting from such up-drafts or down-drafts exceeds the amount of motion required to displace the generator the permissible amount whereby the overload device absorbs the excessive force developed by said member to thereby prevent slippage and consequent loss of reference in said clutch means, and means for energizing said clutch means to connect said pressure responsive member with said generator and for energizing said electro-magnet to make said centering means ineffective on said generator.

7. An altitude controller for operating the elevator surface of an aircraft to automatically maintain craft flight at a predetermined altitude level comprising a displaceable signal generator which when actuated develops a signal for operating said elevator, a displaceable member responsive to changes in static pressure when the craft departs from said predetermined altitude level for actuating said generator, means for drivably connecting said generator with said pressure responsive member, manually operable means for preselecting the maximum allowable displacement of said generator by said pressure responsive member to thereby prevent the development of excessive signals by said generator when the craft is subjected to excessive up-drafts or down-drafts, and an overload device actuated by said pressure responsive member when motion of the latter resulting from such up-drafts or down-drafts exceeds the amount of motion required to displace the generator its predetermined maximum amount whereby the overload device absorbs the excessive force developed by said member to thereby prevent slippage and consequent loss of reference in said drivable connection between said pressure responsive member and said signal generator.

8. An altitude controller for operating the elevator surface of an aircraft for automatically maintaining craft flight at a predetermined altitude level comprising a movable signal generator for developing a signal for actuating the surface when the craft departs from a predetermined altitude level, means normally centering said generator in a non-signal generating position, means responsive to pressure changes due to changes in craft altitude level for actuating said signal generator from said non-signal generating position, and means operatively connecting said pressure responsive means to said generator and making said centering means ineffective on said generator.

F. HENRY S. ROSSIRE.

REFERENCES CITED

The following references are of record in the file of this patent:

UNITED STATES PATENTS

| Number | Name | Date |
| --- | --- | --- |
| 2,405,228 | McGrath | Aug. 6, 1946 |
| 2,415,429 | Kellogg | Feb. 11, 1947 |
| 2,415,430 | Fischl | Feb. 11, 1947 |